2 Sheets--Sheet 1.

C. H. WATERS.

Machine for Painting Wire-Cloth.

No. 6,625. Reissued Aug. 31, 1875.

Chas. H. Waters

WITNESSES

Harry King

B. F. Morse

INVENTOR

By his Attorney

Wm. D. Baldwin

N. PETERS, PHOTO-LITHOGRAPHER, WASHINGTON, D. C.

C. H. WATERS.

Machine for Painting Wire-Cloth.

No. 6,625. Reissued Aug. 31, 1875.

Chas. H. Waters.

WITNESSES

Harry King.

B. F. Morse

INVENTOR

By his Attorney

Wm. G. Baldwin

N. PETERS, PHOTO-LITHOGRAPHER, WASHINGTON, D. C.

UNITED STATES PATENT OFFICE.

CHARLES H. WATERS, OF GROTON, ASSIGNOR TO THE CLINTON WIRE-CLOTH COMPANY, OF CLINTON, MASSACHUSETTS.

IMPROVEMENT IN MACHINES FOR PAINTING WIRE-CLOTH.

Specification forming part of Letters Patent No. 84,520, dated December 1, 1868; reissue No. No. 4,462, dated July 4, 1871; reissue No. 6,625, dated August 31, 1875; application filed January 7, 1875.

DIVISION A.

*To all whom it may concern:*

Be it known that I, CHARLES H. WATERS, of Groton, in the county of Middlesex and State of Massachusetts, have invented a new and useful Machine for Painting Wire-Cloth, of which the following is a specification:

My invention relates to a new mode of painting wire-cloth, which constitutes the subject-matter of another division of the application for the reissue of original Letters Patent No. 84,520, filed simultaneously herewith, and which consists, as an improvement in the art of painting wire-cloth, in passing the cloth through a mass of paint more than sufficient to cover the whole surface of the cloth with paint, and then subjecting the surface of the cloth to pressure to squeeze or press off the surplus paint.

My present invention consists in certain apparatus especially adapted for so painting wire-cloth, of which apparatus—

Figure 1:
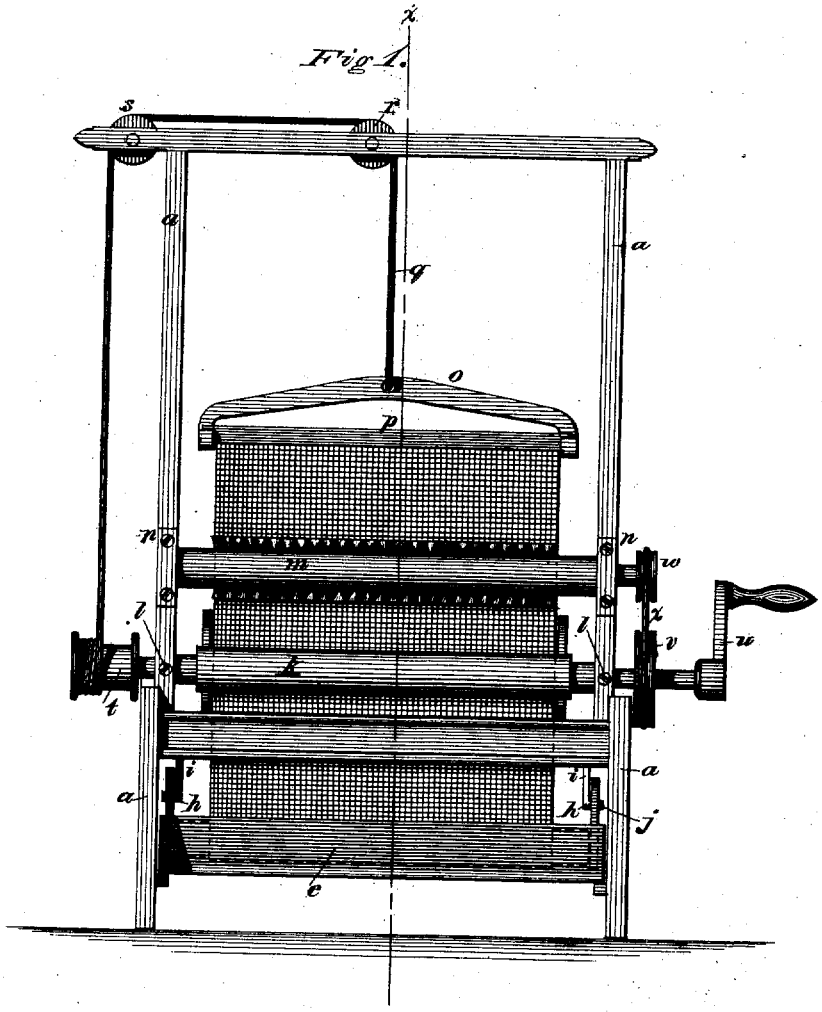
Figure 2:
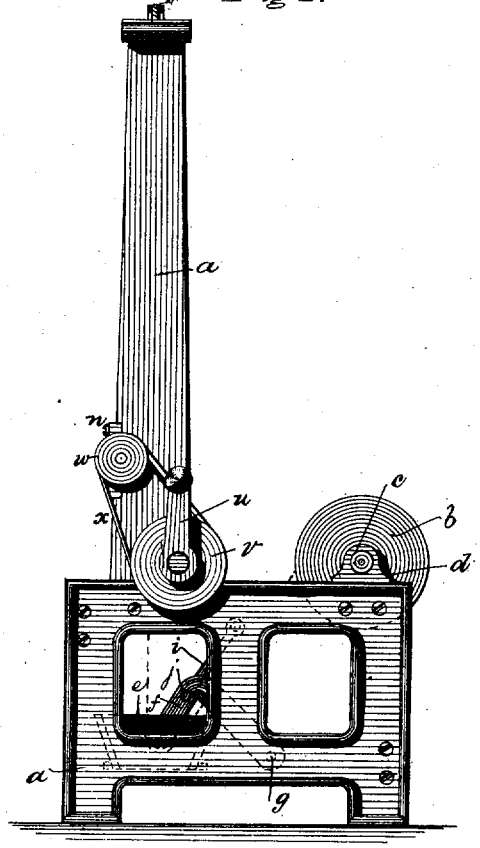
Figure 3:
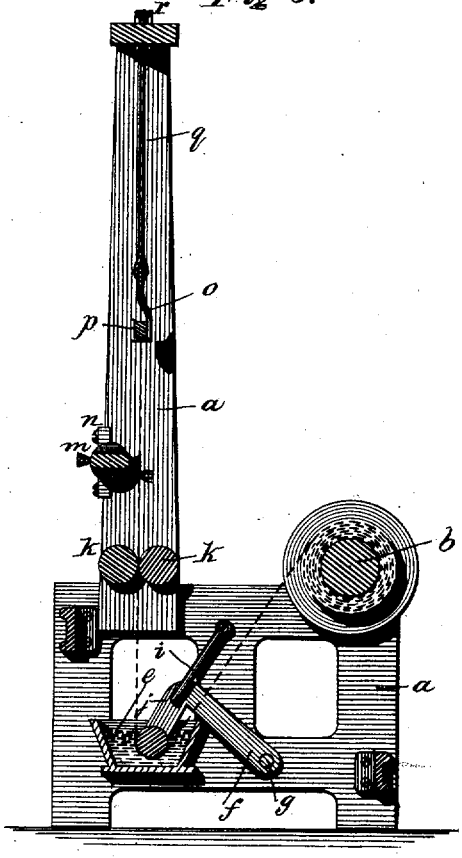

Figure 1 is a front elevation; Fig. 2, an end view; and Fig. 3, a vertical section therethrough, on the line *x x* of Fig. 1.

In the accompanying drawings, *a a a* represent the frame of the machine supporting all the working parts, of which *b* is a beam or roll of wire-cloth, its journals *c c* resting in the boxes *d d*. *e* is a trough or reservoir to contain paints, lying horizontally across the machine, parallel with beam or roll *b*. *f f* are levers, being pivoted at one end upon the studs *g g* in the frame *a*, and supporting a roll in boxes at the opposite ends, which is immersed in the paint in the paint trough or reservoir *e*, all being held in their proper place by the hooks *h h*, secured to the frame *a* by the studs *i i*, and passing through the levers *f f* at the point *j*. *k k* are two pressure-rolls, whose surfaces are composed of elastic material, which press or squeeze off the surplus paint from the cloth, and which, by the aid of the set-screws *l l*, have the effect of graduating the amount of paint to be left upon the cloth after passing between them. *m* is a rotary brushing device, having two or more brushes, and supported in the frame *a a* in the boxes *n n*, at a proper distance from the cloth to allow it to brush it sufficiently to break all the films of paint which may fill the meshes when a viscid paint is used, as it passes upward, being drawn by the bow-shaped metallic device *o*, provided with sockets at each end to receive the ends of the clamp *p*, which is secured to the end of the cloth, said device *o* being attached to the rope *q*, which passes upward to the grooved pulley *r*, thence horizontally to the grooved pulley *s*, thence to the flanged pulley *t* upon shaft of roll *k*. *u* is a crank upon the end of the pressure-roll shaft, and upon the same shaft is a grooved pulley, *v*. *w* is a grooved pulley upon the shaft of the rotary brush *m*, on the same vertical plane with the pulley *v*, motion being transmitted from *v* to *w* by a belt, *x*.

Having described the manner in which the devices composing my machine are arranged, I will now proceed to describe how the same operate together. The end of the wire-cloth wound upon the beam or roll *b* is passed under the roll in the trough *e* of paint by the attendant, and thence to pressure-rolls *k k*, which, being turned by the crank *u*, causes them to seize the cloth and draw it through in a perpendicular direction. The clamp *p* is then attached to the end of the cloth and placed in the sockets of the lifting device *o*, attached to the rope *q*, which passes over the rolls *r* and *s* to the cylinder *t*, raising the cloth as it passes between the pressure-rolls *k k*. The grooved pulley *v*, secured to the shaft of the roll *k*, receives an endless belt, *x*, which passes around the grooved roll *w*, thereby communicating motion to the brushing device *m* as the cloth passes by in the process of painting, breaking all films which may fill the meshes when a viscid paint is used. By immersing the wire-cloth in a bath or mass of paint, as herein described, it is more evenly coated with paint than can possibly be done by hand.

I prefer to place the machine at the bottom of a drying-room, of any desirable height, the grooved pulleys *r* and *s* being secured at the top; and when the desired length of cloth to be hung in this room has passed through the process of painting it is cut off and lifted out of the sockets in device *o*, and suspended upon brackets so arranged as to receive the projecting ends of the clamp *p*.

What I claim as my invention is—

1. The combination of the wire-cloth beam, the paint-trough, and the pressure-rolls, substantially as described.

2. The combination of the paint-trough, the pressure-rolls, and a mechanism by which the wire-cloth, after being painted, is drawn off from the rolls, substantially in the manner and for the purpose specified.

3. The arrangement of the paint-trough, the pressure-rolls, and the drawing-off mechanism, whereby the painted cloth is drawn from the pressure-rolls into the drying-room, substantially as described.

4. The combination of the brushing device, the paint-trough, the pressure-rolls, and the drawing-off mechanism, substantially as described.

5. The combination, with the paint-trough, of the pressure-rolls when the said rolls have their axes adjustable toward and from each other, so as to graduate the amount of paint to be left upon the cloth after being drawn through them, substantially as described.

6. The combination of the paint trough or reservoir and the pressure-rolls, substantially as described.

CHARLES H. WATERS.

Witnesses:

N. AUSTIN PARK,

R. L. ROBERTS.